United States Patent [19]

Matsumoto

[11] Patent Number: 5,519,498
[45] Date of Patent: May 21, 1996

[54] IMAGE FORMING APPARATUS

[75] Inventor: Tatsumi Matsumoto, Sagamihara, Japan

[73] Assignee: Kabushiki Kaisha Toshiba, Kawasaki, Japan

[21] Appl. No.: 35,587

[22] Filed: Mar. 23, 1993

[30] Foreign Application Priority Data

Sep. 11, 1992 [JP] Japan .................................... 4-243628

[51] Int. Cl.⁶ ..................................................... H04N 1/21
[52] U.S. Cl. ............................ 358/296; 358/448; 382/137
[58] Field of Search ..................................... 358/296–300, 358/442–462; 382/41–51; 395/100–118, 128, 133–139; 346/2

[56] References Cited

U.S. PATENT DOCUMENTS

| | | | |
|---|---|---|---|
| 4,788,599 | 11/1988 | Sugishima | 358/296 |
| 5,212,741 | 5/1993 | Barski et al. | 382/51 |
| 5,239,383 | 8/1993 | Ikeda et al. | 358/300 |

FOREIGN PATENT DOCUMENTS 490348 12/1991 European Pat. Off. .
63-67870 3/1988 Japan .
2189964 11/1987 United Kingdom .

OTHER PUBLICATIONS

Patent Abstracts of Japan, JP 3201670, Sep. 1991, Abstract Publication Date: Nov. 1991, Abstract vol.: 015465.

*Primary Examiner*—Peter S. Wong
*Assistant Examiner*—K. C. Shin
*Attorney, Agent, or Firm*—Foley & Lardner

[57] ABSTRACT

An image-forming apparatus which forms an image in an oblique print mode in units of blocks which are separated by line spaces. Every time the count value of the white-dot counter 96 reaches the predetermined value, it is determined that an image block is spaced apart from the preceding one. The data item representing the first line of the image block is not shifted at all, and the data items representing the following lines of the image block are shifted by the distance proportional to the angle, by twice said distance, by thrice said distance, and so on. As a result, the image data is printed on a paper sheet, in an oblique form, with no parts extending outside the paper sheet.

12 Claims, 7 Drawing Sheets

IMAGE FORMING APPARATUS

BACKGROUND OF THE INVENTION

1. Field of the Invention

The present invention relates to an image forming apparatus, and more particularly to an image forming apparatus, such as a copying apparatus, for reading an image formed on an original sheet, converting the image into image signals, and forming an image on a paper sheet in accordance with the image signals.

2. Description of the Related Art

Various types of digital electronic copying machines have been put to practical use. The copying machine of any type comprises a CCD line sensor, a signal processor, and a printer such as a laser printer. The sensor reads an image from an original sheet and generates image signals. The signal processor processes the image signals. The printer prints an image on a paper sheet in accordance with the image signals output by the signal-processing device.

Among these copying machines is one which can process image signals into signals representing an oblique image. The copying machine of this type is set in an oblique print mode, and an operator inputs into the copier a desired angle at which to incline an image to copy and, and initial values (e.g., center position of the image and the first addresses of an image data stored in memory). The image signals are processed in accordance with the angle and the initial values, into signals which represent an oblique image. More specifically, addresses of the image signals representing the dots of each line are shifted by a predetermined value corresponding to the angle, with respect to those of the immediately preceding line. In some cases, an oblique image represented by the signals thus processed may not be printed in its entirety on a paper sheet, with its end portion printed outside the sheet.

SUMMARY OF THE INVENTION

The object of the present invention is to provide an image forming apparatus which can process image signals into signals representing an oblique image and can print the oblique image in its entirety on a paper sheet.

According to the invention, there is provided an image forming apparatus, comprising:

means for scanning target areas including image areas in a first direction;

means for producing image signals representative of the shade of darkness of areas being scanned by the scanning means;

means for forming line images on an image bearing member in accordance with the image signals, the line images being formed along a second direction crossing the first direction and shifted in the second direction by a predetermined amount so that an oblique image is formed;

means for detecting no image region on which no image is in the second direction; and means for resetting the shifting operation of the line image by the forming means.

The image forming apparatus can also include:

value-setting means for setting an oblique print mode, an angle at which to incline an image, and a read-start address;

image-reading means for reading an image formed on an original sheet in unit of pixels forming a line; signal-generating means for generating read clock pulses and write clock pulses;

first counter means for counting the write clock pulses;

memory means for storing a one-line data item read by the image-reading means at an address designated by the number of write clock pulses counted by the first counter means;

determining means for determining whether each pixel signal read by the image-reading means represents a white pixel and for generating a white-pixel signal representing the white pixel;

second counter means for counting the white-pixel signals generated by the determining means and generating a line-clear signal when the number of white-pixel signals reaches a predetermined value;

third counter means for counting shift signals generated by the signal-generating means, thereby to update the initial address signal which has been set in the third counter means when the third counter means is cleared by a line-clear signal generated by the second counter means;

fourth counter means for counting the read clock pulses, thereby to update the read-start address and output a read address;

data-reading means for reading the pixel signals forming each one-line data item, sequentially from the memory means in accordance with the read addresses output by the fourth counter means; and image-forming means for forming an image on an image-forming medium, the image being one represented by the one-line data items read from the memory means by the data-reading means.

Furthermore, according to the invention, there is provided a method of forming an image, comprising steps of:

scanning target areas including image areas in a first direction;

producing image signals representative of the shade of darkness of the scanning areas;

forming line images on an image bearing member in accordance with the image signals, the line images being formed along a second direction crossing the first direction and shifted in the second direction by a predetermined amount so that an oblique image is formed;

detecting a no image region on which no image is in the second direction; and resetting the shifting operation of the line images by the forming means.

In the image forming apparatus, the value-setting means sets an oblique print mode, an angle at which to incline an image, and a read-start address; the image-reading means reads an image formed on an original sheet in unit of pixels forming a line; the signal-generating means generates read clock pulses and write clock pulses; the first counter means counts the write clock pulses; the memory means stores a one-line data item read by the image-reading means at an address designated by the number of write clock pulses counted by the first counter means; the determining means determines whether each pixel signal read by the image-reading means represents a white pixel and generates a white-pixel signal representing the white pixel; the second counter means counts the white-pixel signals generated by the determining means and generates a line-clear signal when the number of white-pixel signals reaches a predetermined value; the third counter means counts shift signals generated by the signal-generating means, thereby to update the initial address signal which has been set in the third counter means when the third counter means is cleared by a line-clear signal generated by the second counter means; the fourth counter means counts the read clock pulses, thereby to update the read-start address and output a read address; the data-reading means reads the pixel signals forming each one-line data item, sequentially from the memory means in accordance with the read addresses output by the fourth counter means; and the image-forming means forms an image on an image-forming medium, the image being one represented by the one-line data items read from the memory means by the data-reading means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An image forming apparatus according to an embodiment of this invention will be described, with reference to the accompanying drawings.

Figure 2:
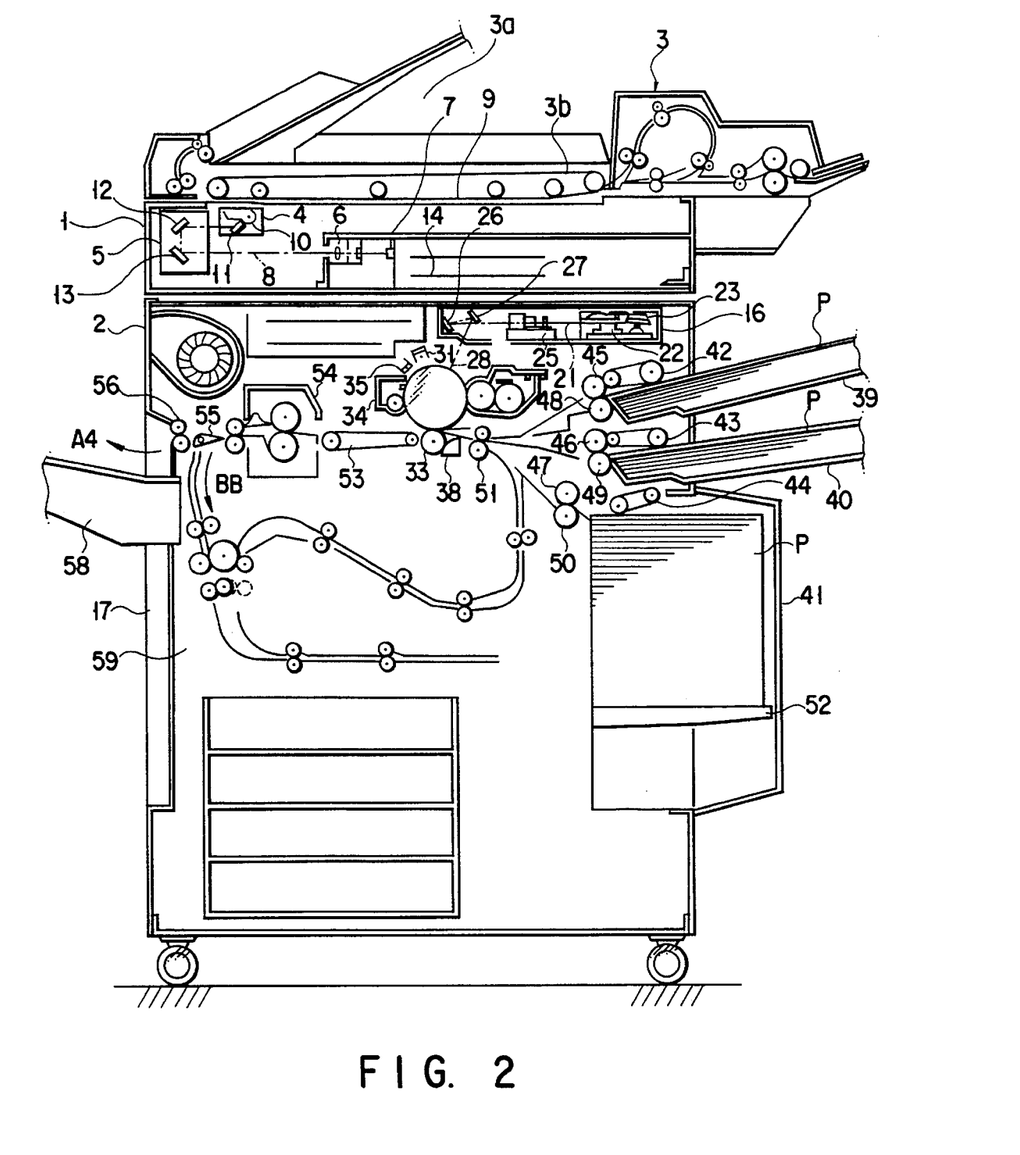
FIG. 2 is a sectional side view showing the copying apparatus.

FIG. 2 schematically illustrates a copying apparatus which is an embodiment of the image forming apparatus according to the present invention. The copying apparatus comprises a scanner 1 and a printer section 2. The scanner 1 is designed to scan an original (e.g., a document sheet) optically, thereby to read image data from the original and converts the image data into a time series of electric signals. The printer section is an output section for printing the image data on a sheet of paper.

As shown in FIG. 2, the scanner 1 comprises a return automatic document feeder (RADF) 3, a first carriage 4, a second carriage 5, a focusing lens 6, and a CCD (line) sensor 7. The first carriage 5, the second carriage 5, the lens 6, and the CCD sensor 7 constitute an exposure section 8.

As is shown in FIG. 2, the original is located on a glass plate 9 in a manner that its document image faces the upper surface of the glass plate. The return automatic document feeder 3 has a conveyer unit 3a. The unit 3a extends horizontally along the glass plate 9, and includes a conveyer belt 3b contacting the plate 9. An original sheet is fed onto the glass plate 9 and held thereon by the conveyer belt 3b. The sheet is positioned on the plate 9 such that its image-bearing side faces downward and, hence, contacts the glass plate 9 and its left shorter edge is aligned with the register formed on the plate 9.

The first carriage 4 has a fluorescent lamp 10 and a mirror 11. The second carriage 5 has two mirrors 12 and 13. The lamp 10 applies light rays to the underside of the original sheet through the glass plate 9 to illuminate target areas, that is, the areas of the document, the glass plate 9 and a sheet cover of the feeder 3. The light is reflected from the original sheet. The mirror 11 on the first carriage 4 receives the light rays and reflects the light rays to the mirror 12 on the second carrier 5. The mirror 12 reflects the light rays to the mirror 13 mounted also on the second carriage 5. The mirror 13 reflects the light rays to the focusing lens 6, which of cuses the light rays on the light-receiving surface of the CCD sensor 7.

The first carriage 4 and the second carriage 5 are moved at different speeds, the ratio of which is 2:1. More precisely, the carriages 4 and 5 are moved by a two-phase pulse motor (not shown) in the sub-scanning direction of the scanner 1, or from the left to the right (FIG. 2), to scan the image printed on the original sheet. The sub-scanning speed of the scanner 1 is changed by a pulse-motor driver (not shown) in accordance with the copy-magnification selected by an operator. That is, the pulse-motor driver, which is an electronic circuit, is designed to drive the pulse motor by ½-phase excitation or micro-step drive. To drive the carriages 4 and 5 at low speeds, in particular, the driver supplies the motor with a current having such a waveform as to cancel out the proper vibration of the carriage-driving mechanism.

The CCD sensor 7 reads the image on the original sheet placed on the glass plate 9, dot by dot, and generates image signals representing the shade of darkness of the scanning area. These signals are supplied to the image-processing section 14 (later described) incorporated in the scanner 1. The section 14 processes the image signals, which are input to the printer section 2.

As is shown in FIG. 2, the printer section 2 comprises a laser optical system 16 and an image-forming section 17. The section 17 is an electrophotography device for forming images on both sides of a sheet of copying paper. The image signals supplied from the image-processing section 14 is processed into drive signals by means of an image-data processing circuit (not shown). The drive signals are supplied to a semiconductor laser (not shown). The laser emits a modulated laser beam 12. The beam 12 is applied to a beam-shaping device (not shown) which has a cylindrical lens and the like. The beam-shaping device outputs a shaped laser beam 12, which is applied to a polygonal mirror 23 which is rotated by a high-speed motor 22 having an air bearing. The polygonal mirror 22 deflects the laser beam 12. The laser beam 21 passes through an f8 lens 25 to a mirror 26. The mirror 26 reflects the beam 21 to a mirror 27. The mirror 27 reflects the beam 21. The laser beam 21 is applied through a protective glass plate 28 onto a photosensitive drum 29, forming beam spots thereon, thus forming an electrostatic latent image which is identical to the image on the original sheet and which has a sufficient resolution. A beam detector (not shown) detects the laser beam 21 deflected by the polygonal mirror 23. Upon detecting a beam 21, the detector outputs a signal. This signal is input to the image-processing section 14, whereby the image signals are rendered synchronous with the laser beams.

Arranged around the photosensitive drum 29 are an electric charger 31 for electrically charging the surface of the drum 29, an image-developing device 32 for developing the electrostatic image with developer, a transfer roller 33 for transferring the image from the drum 29 to a copying paper sheet, a cleaner 34 for removing residual developer from the surface of the drum 29, and a discharging lamp 35 for electrically discharging the surface of the drum 29.

An electric motor (not shown) rotates the photo sensitive drum 29 is rotated at a circumferential speed V0. The electric charger 31, which opposes the surface of the drum 29 having a grid electrode, electrically charges the surface of the photosensitive drum 29. As the laser beam 21 is applied to the surface of the drum 29, forming an electrostatic latent image. As the drum 28 is rotated at the circumferential speed V0, the latent image passes through the image-developing device 32. The device 32 applies toner onto the surface of the drum 29. As a result, the latent image is developed into a toner image which is visible. The drum 29 is further rotated at the speed V0, the toner image reaches the transfer roller 33. The roller 33 transfers the toner image from the drum 29 onto a paper sheet P which has been supplied by a paper-feeding system (later described). The residual toner is removed from the transfer roller 33 by a transfer-roller cleaner 38.

The paper-feeding system comprises various components and can feed paper sheets p (i.e., image-forming media) from three paper cassettes, two paper cassettes 39 and 40 and a large paper cassette 41. It further comprises a sheet-inverting mechanism 59 designed to invert a paper sheet P with an image copied on one side, so that that another image may be copied on the other side of the sheet P.

A paper sheet P is fed from the selected one of the cassettes 39, 40, and 41. More precisely, the uppermost of the sheets P contained in the selected cassette is supplied from the cassette by a pickup roller 45 and a sheet-separating roller 48, a pickup roller 46 and a sheet-separating roller 49, or a pickup roller 47 and sheet-separating roller 50. The sheet p is thereby fed, at a desired time, to an image transfer section, more precisely, to a register roller 51.

As shown in FIG. 2, an elevator 52 is arranged in the large cassette 51, supporting a stack of paper sheets P. The elevator 52 gradually moves upwards as the sheets P are supplied from the cassette 51 one after another, such that the uppermost sheet P of the stack is located at a predetermined level.

A sheet transport mechanism 53, an image-fixing device 54, a switching guide 55, and a sheet-discharging device 56 are arranged at the downstream of the transfer roller 33. The mechanism 53 transports a sheet P from the nip between the drum 29 and the roller 33 to the image-fixing device 54. The device 54 fixes the toner image on the sheet P. The guide 55 can be rotated to guide the sheet P into a first passage AA or a second passage BB. When it assumes the position shown in FIG. 2, it guides the sheet P into the first passage AA, whereby the sheet P is fed by sheet-discharging rollers 56 onto a paper tray 58 which projects from one side of the copying apparatus.

Figure 3:
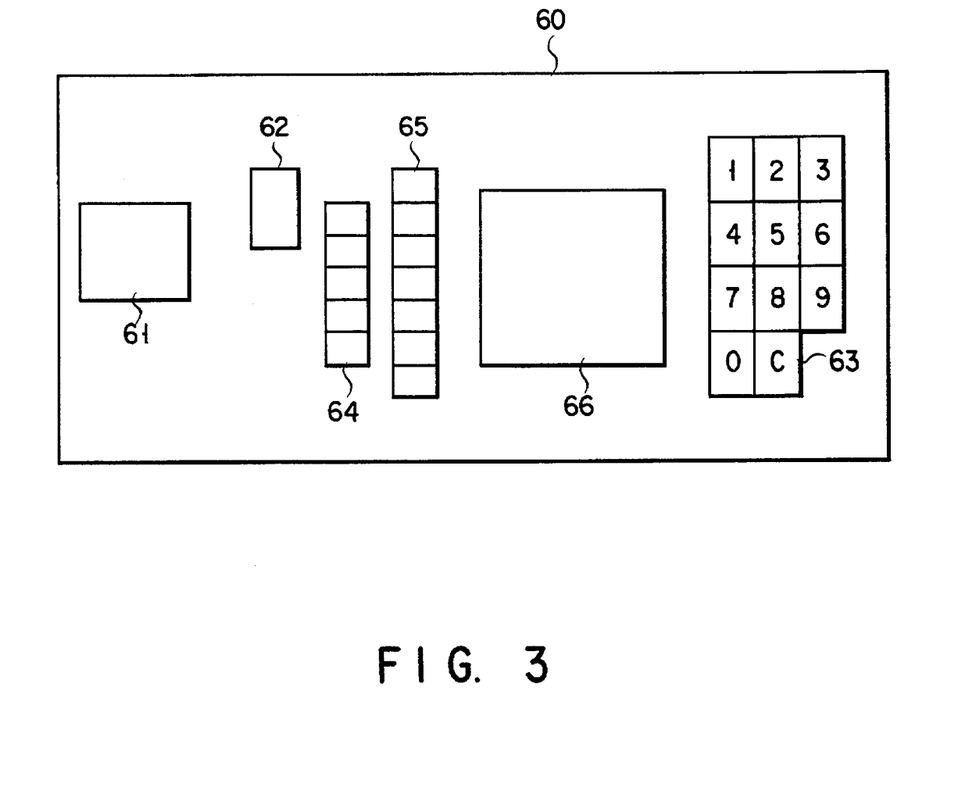
FIG. 3 is a schematic representation of the operation panel of the copying apparatus.

An operation panel 60 is mounted on the front side of the copying apparatus. As shown in FIG. 3, the operation panel 60 has a copy key 61, an oblique print mode key 62, a ten-key pad 63, a magnification-setting section 64, a density-selecting section 65, and a display 66. When the copy key 61 is operated, the apparatus will start a copying operation. When the key 62 is operated, the apparatus will be set in oblique print mode. The keys of the pad 63 are pushed to input the number of desired copies, the angle at which to incline an image when the image is copied in the oblique print mode, and the first of the addresses from which to read image data. The magnification-setting section 64 is operated to input a desired magnification at which to enlarge or reduce the original image. The density-selecting section 65 is operated to select one of, for example, seven prescribed copying densities. The display 66 is designed to display various values set or selected and various instructions.

Figure 1:
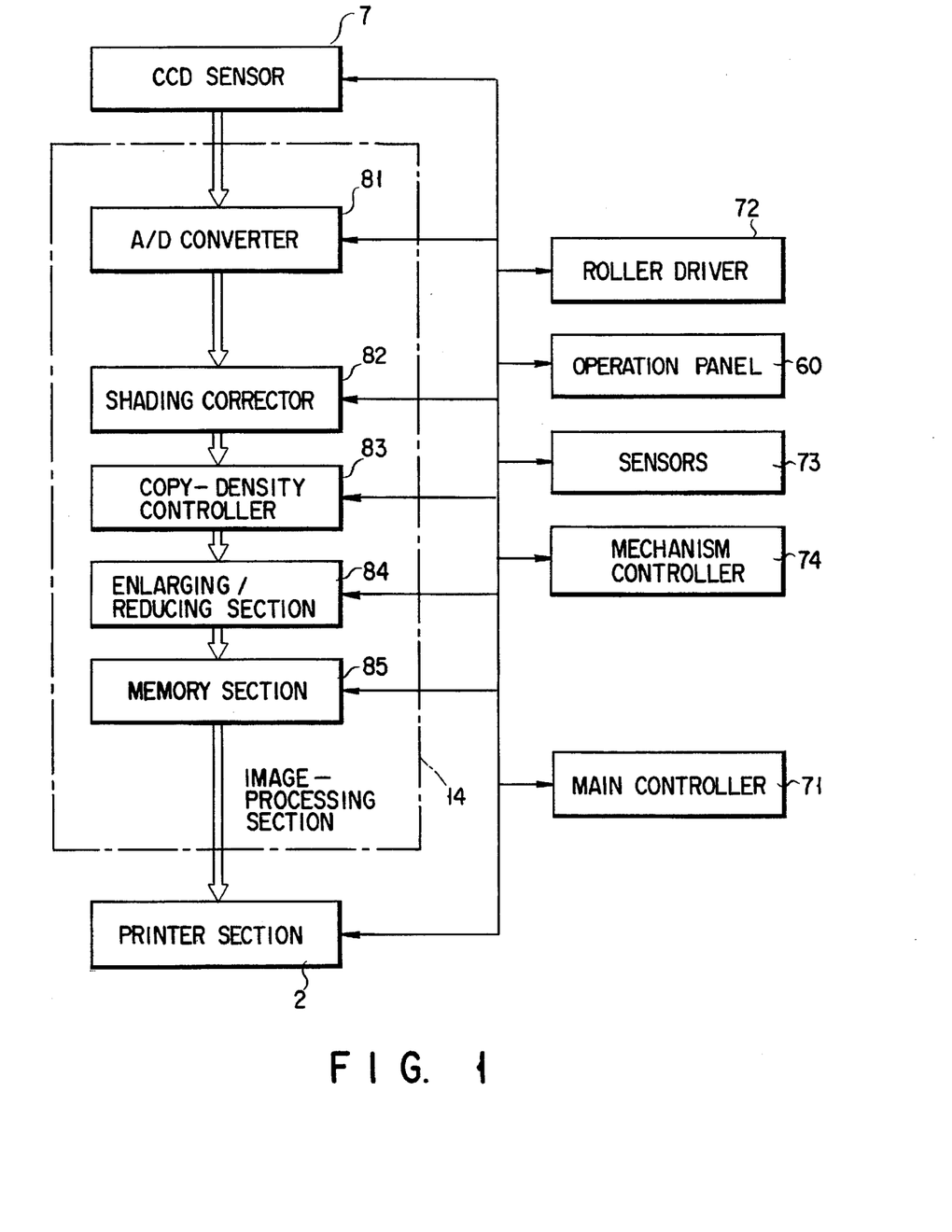
FIG. 1 is a block diagram illustrating the control system of a copying apparatus according to an embodiment of the present invention.

FIG. 1 illustrates the control system incorporated in the copying apparatus. The control system comprises a main controller 71, or a CPU 71, for controlling the various other components. To be more specific, the CPU 71 is connected to the operation panel 60, a roller driver 72 for driving the rollers of the return automatic document feeder 3, various sensors 73 located with in the apparatus, a mechanism controller 74 for controlling the various mechanisms provided within the apparatus, the image-processing section 14 described above, and the printer section 2 described above.

The image-processing section 14 is designed to process the analog image signals which have been supplied from the CCD sensor 7 and which represent the density of the image formed on the original sheet placed on the glass plate 9. The section 14 comprises an A/D converter 81, a shading corrector 82, a copy-density controller 83, an enlarging/reducing section 84, and a memory section 85. The A/D converter 81 is designed to convert analog image signals to digital image signals. The corrector 82 is used to compensate for the difference in sensitivity among the photoelectric elements of the CCD sensor 7 and the non-uniform distribution of the light emitted from the fluorescent lamp 10. The section 84 is designed to process the digital signals in order to form an image which is identical to and either larger or smaller than the original image. The memory section 85 is provided for storing the image data output by the section 84, which represents the image the printer section 2 is to print on a paper sheet P.

The A/D converter 81 converts the analog image data supplied from the CCD sensor 7, into digital image data. The digital image data is input to the shading corrector 82. The shading corrector 82 corrects the digital image data, thereby compensating for the difference in sensitivity among the photoelectric elements of the CCD sensor 7 and the non-uniform distribution of the light emitted from the fluorescent lamp 10. The corrected image data is supplied to the copy-density controller 83. The controller 83 changes the density data contained in the image data in accordance with the desired density set by operating the density-selecting section 65 of the operation panel 60. More precisely, the data representing the desired density is stored from a memory (not shown) incorporated in the main controller 71 into the RAM (not shown) incorporated in the copy-density controller 83, and the controller 83 processes the image data supplied from the shading corrector 82 in accordance with the data representing the desired density.

The image data thus processed is supplied to the enlarging/reducing section 84. The section 84 processes the image data in order to produce an image identical to, and either larger or smaller than, the image formed on the original sheet. More specifically, the section 84 performs linear interpolation on the input data in accordance with the magnification set by operating the magnification-setting section 64, thereby generating data which represents an image expanded in the main-scanning direction of the CCD sensor 7. Alternatively, the section performs projection method on the input data in accordance with the magnification set by operating the section 64, thereby generating data which represents an image image compressed in the main-scanning direction of the CCD sensor 7. The image is expanded or compressed in the sub-scanning direction of the CCD sensor 7 by changing the speed of a pulse motor (not shown) which moves both carriages 4 and 5, to a value corresponding to the magnification set by operating the magnification-setting section 64.

The image data output by the enlarging/reducing section 84 is supplied to the memory section 85, in units of one-line image data items. Under the control of the main controller 71 the memory section 85 stores the one-line image data items. Whenever necessary, the image data is supplied from the memory section 85 to the printer section 2.

Figure 4:
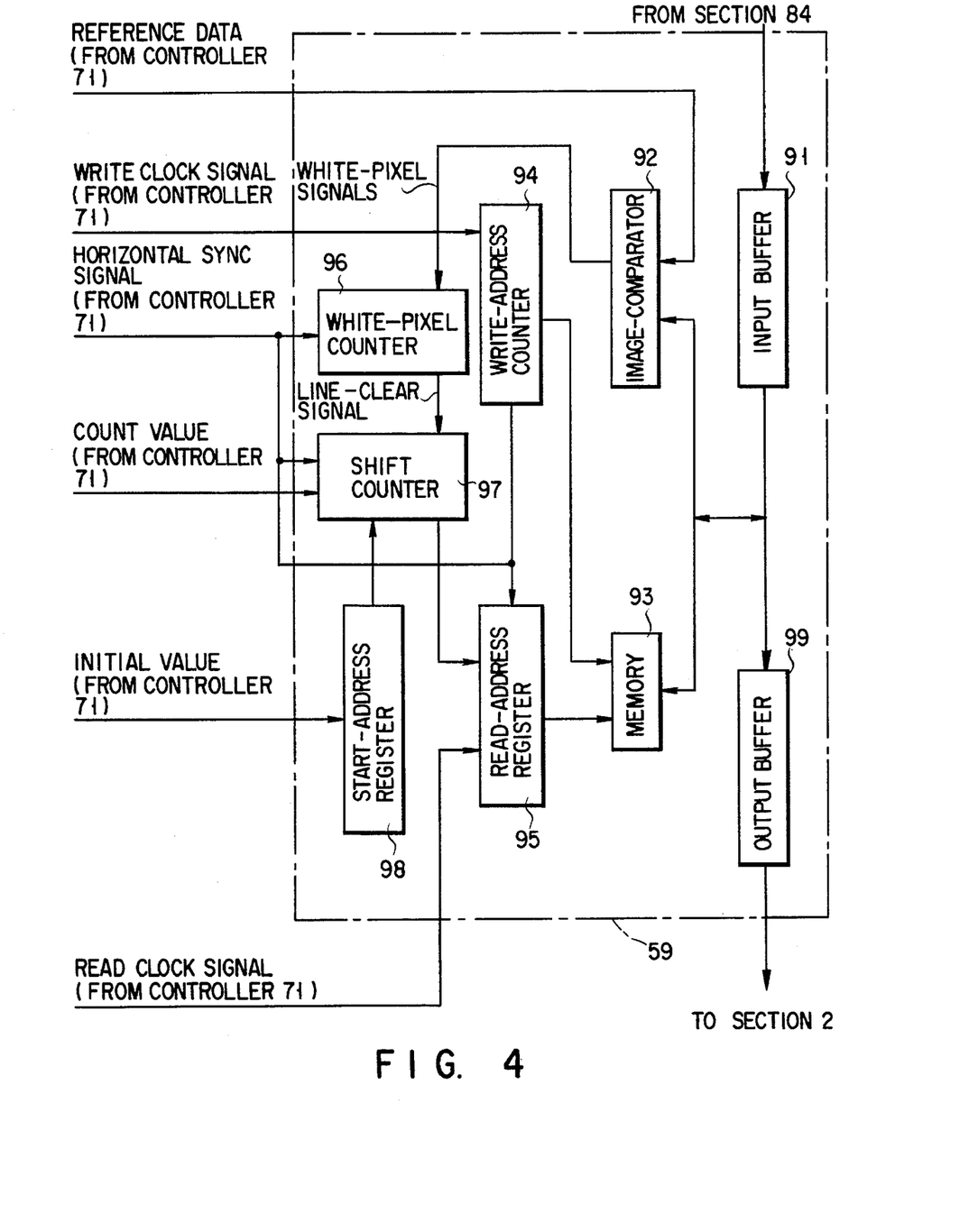
FIG. 4 is a block diagram schematically showing the memory section of the copying apparatus.

As shown in FIG. 4, the memory section 85 comprises an input buffer 91, an image comparator 92, a memory 93, a write-address counter 94, a read-address counter 95, a white-dot counter 96, a shift counter 97, a start-address register 98, and an output buffer 99. The input buffer 91 is provided for temporarily storing image data. The comparator 92 is used to compare the image data supplied from the buffer 91 with the reference data supplied from the main controller 71, thereby determining whether the image represented by the data output by the buffer 91 has a blank space, and to generate white-dot signals which define a blank portion, if any in the image. The memory 93 is provided for storing the image data read from the input buffer 91. The write-address counter 94 and the read-address counter 95 are designed to generate a write address and a read address, respectively. The white-dot counter 96 is designed to count white-dot signals, and the shift counter 97 to generate data items each representing an address shifted for forming an oblique image. The start-address register 98 is provided for storing the first of the addresses shifted for forming the oblique image, and the output buffer 99 is provided for temporarily storing the image data.

In operation, the input buffer 91 temporarily stores the image data supplied from the the enlarging/reducing section 84. The data is supplied from the buffer 91 to the image comparator 92. The comparator 92 compares the image data, in units of dot signals, with the reference data supplied from the main controller 71. The reference data is hexadecimal data F0 representing the density of a black dot, while hexadecimal data FF represents the density of a white dot. More precisely, the comparator 92 compares the density represented by each dot signal, with the reference density represented by the reference data. If the value of the dot signal has a value greater than the reference data, the comparator 92 determines that the signal represents a white dot, and generates a white-dot signal, which is supplied to the white-dot counter 96.

In the meantime, the write-address counter 94 supplies write addresses to the memory 93 in synchronism with the clock pulses supplied from the main controller 71. One-line image data items, each representing 1000 dots, are supplied from the input buffer 91 to the memory 93, in accordance with the write addresses. Also, the read-address counter 95 supplies read addresses to the memory 93 in synchronism with the clock pulses supplied from the main controller 71. Hence, the one-line data items are read from the memory 93 and supplied to the output buffer 99, in accordance with the read addresses.

It will be explained how the address counters 94 and 95 generate a write address and a read address, respectively. The counter 94 starts counting write clock pulses supplied the controller 71, every time it is cleared by a horizontal sync signal (HSYNC) supplied from the main controller 71, and generates a write address the moment its count reaches 1000. The write address, thus generated, is supplied to the memory 93. The counter 95 starts counting read clock pulses supplied the controller 71 every time it cleared by a horizontal sync signal (HSYNC), and generates a read address the moment its count reaches 1000. The read address, thus generated, is supplied to the memory 93.

The white-dot counter 96 counts the white-dot signals which the comparator 92 outputs for each line of the image. When its count reaches 990, the counter 96 outputs a line-clear signal which indicates that the signals represent a blank line. The line-clear signal is supplied to the the shift counter 97. The white-dot counter 96 is clearly by a horizontal sync signal.

The shift counter 97 determines the distance by which to shift each line of the image when the copying apparatus is set in the oblique print mode. To be more specific, the counter 97 obtains the distance by adding the initial count value stored in the start-address register 98 to the count value supplied from the controller 71 and representing the angle at which the original image is inclined. The line-shift distance, thus determined, is output, as initial pseudo-address, to the read address counter 95. In other words, the shift counter 97 is cleared by a line-clear signal supplied from the white-dot counter 96, and the initial count value stored in the start-address register 98 is stored, as read-start address, into the the shift counter 97.

In response to every horizontal sync signal supplied from the main controller 71, the count of the shift counter 97, which represents a read address, starts increasing or decreasing, to designate the first of the addresses shifted for forming an oblique image. This count value designating the read-start shifted address is output to the read address counter 95.

when the copying apparatus is not set in the oblique print mode, the initial value and the count value from the main controller 71 are "0." Hence, the shift counter 97 outputs a line-shift distance of "0", which is supplied to the read address counter 95. The start-address register 98 stores the initial value supplied from the main controller 71. This initial value, which has been set by operating the operation panel 60, indicates the first of the addresses which are to be shifted for forming an oblique image. The image data read from the memory 93 is temporarily stored in the output buffer 99. When necessary, the image data is supplied from the buffer 99 to the printer section 2.

Figure 5:
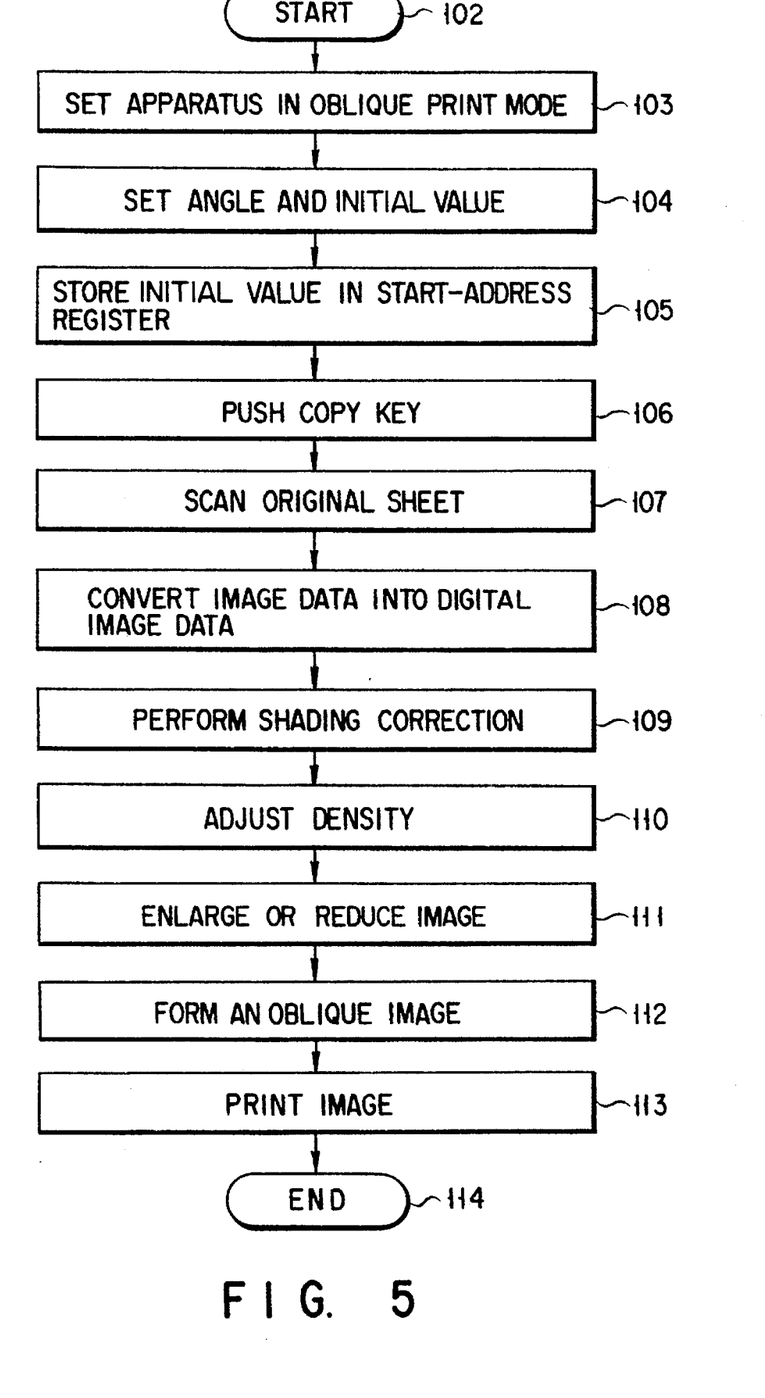
FIG. 5 is a flow chart explaining the operation of the apparatus shown in FIG. 2.

How the copying apparatus described above and shown in FIGS. 1 to 4 operates will be explained, with reference to the flow chart of FIG. 5.

In Step 102, an operator turns on the power-supply switch of the copying apparatus. In Step 103, he or she operates the panel 60, thereby setting the apparatus in the oblique print mode. Then, in Step 104, the operator operates the ten-key pad 63, inputting the angle at which an image is inclined when the image is copied in the oblique print mode, and the initial value indicating the first of the addresses from which to read image data. In Step 105, the main controller 71 stores the initial value in the start-address register 98 of the memory section 85, and reads the initial value from the register 98 and stores it, as read-start address, into the the shift counter 97.

Next, in Step 106, the operator places original sheets on the original tray (not shown) of the return automatic document feeder 3 and pushes the copy key 61 on the operation panel 60. The feeder 3 feeds the first original sheet and places it on the glass plate 9. In Step 107, the main controller 71 controls the mechanism controller 74, whereby the exposure section 8. As a result, the CCD sensor 7 scans the original sheet, reading the image formed thereon, and generates analog image data consisting of dot signals representing the densities of the dots defining the image. The analog image data is supplied to the A/D converter 81 of the image-processing section 14. In Step 108, the A/D converter 81 converts the analog image data into digital image data, which is supplied to the shading corrector 82.

In Step 109, the shading corrector 82 performs shading correction on the digital image data output by the A/D converter 81, thereby compensating for the difference in sensitivity among the photoelectric elements of the CCD sensor 7. The corrected image data is supplied to the copy-density controller 83. In Step 110, the controller 83 adjusts the density data contained in the image data, in accordance with the desired density set by operating the density-selecting section 65. The image data processed by the controller 83 is supplied to the enlarging/reducing section 84.

In Step 111, the enlarging/reducing section 84 processes the image data into data which represents an image identical to, and either larger or smaller than, the image formed on the original sheet. The image data generated by the section 84 is supplied to the memory section 85, in units of one-line image data items.

In Step 112, the memory section 85 stores the one-line image data items, under the control of the main controller 71, such that these data items are shifted in accordance with the initial value stored in the start-address register 98 and the angle at which an image is inclined. As described above, the initial value indicates the first of the addresses from which to read image data. In Step 113, the image data is supplied from the memory section 85 to the printer section 2, which prints on a paper sheet an image identical to the original image but inclined at said angle.

Figure 6:
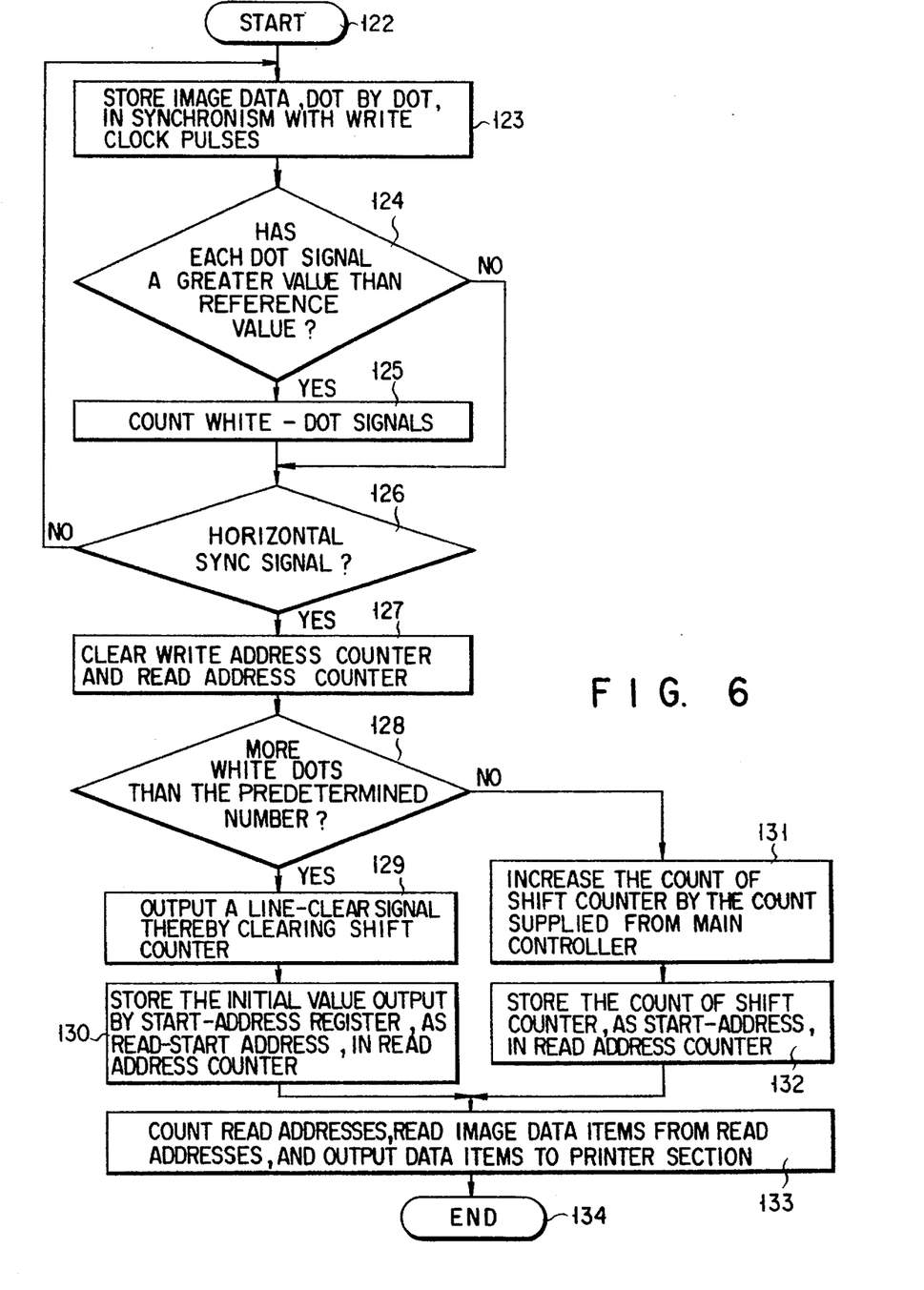
FIG. 6 is a flow chart explaining how the memory section performs its function.

It will now be explained how the memory section 85 stores the one-line image data items supplied from the enlarging/reducing section 84, with reference to the flow chart of FIG. 6.

In Step 122, the operator operates the panel 60, setting the apparatus in the oblique print mode. Then, in Step 123, the first dot signal of the image data output by the enlarging/reducing section 84 and stored in the input buffer 91 is supplied to the image comparator 92 and the memory 93. Hence, the first dot signal is in the memory 93, at the write address which the write-address counter 94 has just generated by counting a write clock pulse supplied from the main controller 71. The first dot signal, thus stored, in the memory 93, represents the density of the first dot of one-line image.

In Step 124, the image comparator 92 compares the first dot signal with the reference value, determining whether or not the density represented by the dot signal is higher than the reference value which is hexadecimal data F0 representing the density of a black dot. If Yes, the comparator 92 generates a white-dot signal, which is supplied to the white-dot counter 96. In Step 125, the white-dot counter 96 counts the white-dot signal. If No, the flow jumps to Step 126.

In Step 126, it is determined whether or not the counter 96 has received a horizontal sync signal from the main controller 71. If No, the flow returns to Step 123, whereby Steps 123 to 125 are repeated for the second dot signal of the image data stored in the input buffer 91. If Yes, the flow goes to Step 127, in which the write-address counter 94, the read-address counter 95, and the white-dot counter 96 are cleared by the horizontal signal (HSYNC). Then, in Step 128, it is determined whether or not the count value of the white-dot counter 96 has reached the predetermined value of 990.

If Yes in Step 128, the flow goes to Step 129, in which the counter 96 outputs a line-clear signal which indicates that the signals represent a blank line, and supplies the line-clear signal to the the shift counter 97. As a result, the shift counter 97 is cleared by the line-clear signal. Then, in Step 130, the initial value stored in the the start-address register 98 is stored into the shift counter 97.

If No in Step 128, that is, if the count value of the white-dot counter 96 is less than 990, the counter 96 outputs no line-clear signal which indicates that the signals represent a blank line, the flow goes to Step 131. In Step 131, the shift value corresponding to the angle is supplied to the start-address register 98 and then stored into the shift counter 97. As a result, the count value of the counter 97 increases or decreased by the shift value of 1 or 2. Then, in Step 132, the count value of the shift counter 97 is supplied to the read-address counter 95 and stored, as the read-start address, in the read-address counter 95.

The read-address counter 95 is cleared every time a horizontal sync signal is supplied to it. The count value of the shift counter 97 is thereby stored, as read-start address, in the read-address counter 95. The count of the counter 95, therefore, increases by one whenever a read clock pulse is supplied to the counter 95 from the main controller 71. The count value of the read-address counter 95 is output, as read address, to the memory 93. Hence, in Step 133, the one-line image data items are sequentially read from the memory 93 to the output buffer 99 and hence to the printer section 2.

More specifically, the data item read from the read-start address of the memory 93 represents the first line of the image, the data item read from the second read address of the memory 93 represents the second line of the image shifted by the distance proportional to the angle, the data item read from the third read address of the memory 93 represents the third third line of the image shifted by twice said distance, and likewise the data item read from the to the nth address of the memory 93 represents the nth line of the image shifted (n–1) times said distance.

If it is found in Step 128 that the count value of the white-dot counter 96 has reached the predetermined value of 990, it is determined that the line of the image, represented by the data item read from the memory 93 is a blank line, and that there is a space between a block of image and the next block of image. In this case, in Step 129 the counter 96 outputs a line-clear signal, clearing the shift counter 97. Then, in Step 130, the initial value stored in the start-address register 98 is stored into the shift counter 97.

Thereafter, the data item representing the first line of the next image block is read from the read-start address of the memory 93 to the output buffer 99, the data item representing the second line of the image block, which is shifted by distance proportional to the angle, is read from the second read address of the memory 93 to the output buffer 99, the data item representing the third line of the image block, which is shifted by twice said distance, is read from the third read address of the memory 93 to the output buffer 99, and likewise the data item representing the nth line of the image block, which is shifted (n–1) times said distance, is read from the nth address of the memory 93 to the output buffer 99.

Figure 7A:
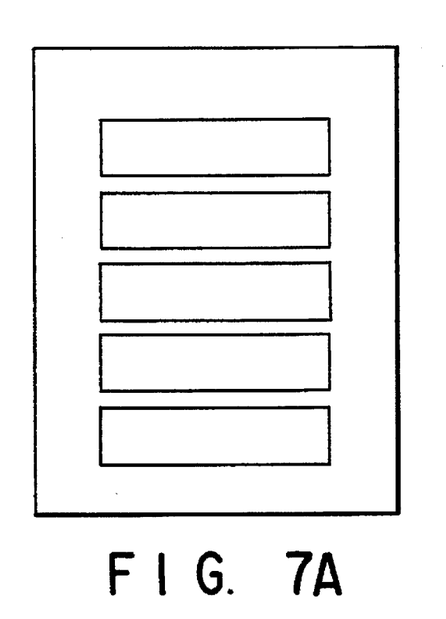
FIGS. 7A and 7B diagrams showing an original sheet and a copied sheet, respectively.
Figure 7B:
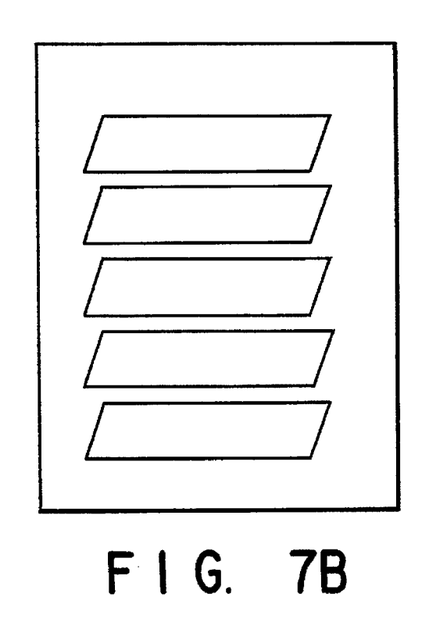

The sequence of the data-item reading, described in the preceding paragraph is performed for any other blocks of the image to be formed in an oblique form. As a result, the data representing the image shown in FIG. 7A is changed to the data representing an oblique image. The oblique image data is supplied from the memory section 85 to the printer section 2. The section 2 prints an oblique image on a paper sheet, with no parts extending outside the paper sheet.

In most cases, an image is formed in the oblique print mode in units of blocks which are separated by line spaces. Thus, in this invention, every time the count value of the white-dot counter 96 reaches the predetermined value, it is determined that a space separates an image block from the preceding one. Then, the data item representing the first line of the image block is not shifted at all, and the data items representing the following lines of the image block are shifted by the distance proportional to the angle, by twice said distance, by trice said distance, and so on. As a result, the image data is printed on a paper sheet, in an oblique form, with no parts extending outside the paper sheet.

As has been described above, the present invention can provide an image forming apparatus which can process image signals into signals representing an oblique image and can print the oblique image in its entirety on a paper sheet.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus for forming an image from one-line image data items obtained by scanning an original sheet having an image, each of said line-data items having a plurality of pixel signals, said apparatus comprising:

value-setting means for setting an oblique print mode, an angle at which an image is inclined, and a read-start address;

signal-generating means for generating a shift signal representing the angle set by said value-setting means for one one-line data item, an initial address signal representing the read-start address set by said value-setting means, a one-line transfer signal for transferring a one-line data item, read clock pulses, and write clock pulses;

first counter means for counting the write clock pulses, thereby to output address signals sequentially, said first counter means capable of being cleared by the one-line transfer signal generated by said signal-generating means;

memory means for storing pixel signals forming each one-line data item, in response to the address signals output from said first counter means;

determining means for comparing each pixel signal of any one-line data item with a reference pixel signal, thereby to determine whether the pixel signal represents a white pixel and to generate a white-pixel signal representing the white pixel;

second counter means for counting the white-pixel signals generated by said determining means and generating a line-clear signal when the number of white-pixel signals reaches a predetermined value, said second counter means capable of being cleared by the one-line transfer signal generated by said signal-generating means;

third counter means for counting shift signals generated by said signal-generating means, thereby to update the initial address signal which has been set in the third counter means when said third counter means is cleared by a line-clear signal generated by said second counter means;

fourth counter means for counting the read clock pulses, thereby to update the read-start address and output a read address;

data-reading means for reading the pixel signals forming each one-line data item, sequentially from said memory means in accordance with the read address output by said fourth counter means, and for clearing said fourth counter means in response to the one-line transfer signal generated by said signal-generating means; and image-forming means for forming an image on an image-forming medium, said image being one represented by one-line data items read from said memory means by said data-reading means.

2. The image-forming apparatus according to claim 1, further comprising input buffer means for temporarily storing the one-line data items supplied from said memory means, which are to be transferred to said image-forming means.

3. The image-forming apparatus according to claim 1, wherein said determining means includes a comparator for comparing density represented by each pixel signal with a reference density and generating a white-pixel signal representing a white pixel when the density represented by the pixel signal is lower than the reference density.

4. The image forming apparatus according to claim 1, further comprising:

image-reading means for reading the image formed on the original sheet in units of pixels forming a line, in response to the one-line read signals, and for outputting pixel signals representing the pixels.

5. The image-forming apparatus according to claim 4, further comprising output buffer means for temporarily storing the one-line data items supplied from said memory means, which are to be transferred to said image-forming means.

6. An image forming apparatus, comprising:

means for receiving image signals representative of a shade of darkness of an image area, the image area having block images and a line space which are arranged along a first direction, the line space extending along a second direction crossing the first direction and the block images being separated by line spaces;

means for comparing the image signals with a predetermined level to generate white dot signals;

means for counting the white dot signals to detect the line space and to generate a clear signal;

means for setting a shifting amount which is increased along the first direction in one of the block images and for clearing the shifting amount in response to the clear signal; and means for forming line images on an image bearing member in accordance with the image signals to form the block images, the line images being formed along the second direction and shifted in the second direction from a reference position by a predetermined amount such that an oblique block image is formed, wherein shifting of the line images is reset in response to the clear signal.

7. The image forming apparatus according to claim 6, further comprising:

means for emitting light rays to illuminate target areas; and means for moving the emitting means in the second direction.

8. The image forming apparatus according to claim 2, further comprising means for sensing the light rays reflected from the target areas to generate the image signals.

9. The image forming apparatus according to claim 6, wherein said forming means includes:

means for emitting a light beam;

means for modulating the light beam in accordance with an image signal; and means for forming a latent image with the light beam.

10. The image forming apparatus according to claim 6, further comprising:

means for sensing a start of a line image to generate said clear signal; and means for causing the forming means to form the line images.

11. An image forming apparatus according to claim 6, wherein said receiving means includes means for scanning a target area in the first direction to generate image signals.

12. A method of forming an image, comprising the steps of:

receiving image signals representative of a shade of darkness of an image area, the image area having block images and a line space which are arranged along a first direction, the line space extending along a second direction crossing the first direction and the block images being separated by line spaces;

comparing the image signals with a predetermined level to generate white dot signals;

counting the white dot signals to detect the line space and to generate a clear signal;

setting a shifting amount which is increased along the first direction in one of the block images and clearing the shifting amount in response to the clear signal; and forming line images on an image bearing member in accordance with the image signals to form the block images, the line images being formed along the second direction and shifted in the second direction from a reference position by a predetermined amount such that an oblique block image is formed and resetting shifting of the line images in response to the clear signal.

* * * * *